(12) United States Patent
Nishioka et al.

(10) Patent No.: US 8,548,070 B2
(45) Date of Patent: Oct. 1, 2013

(54) DRIVER CIRCUIT, RECEIVER CIRCUIT, AND METHOD OF CONTROLLING A COMMUNICATIONS SYSTEM INCLUDING THE CIRCUITS

(75) Inventors: Shinichiro Nishioka, Osaka (JP); Yoshihide Komatsu, Osaka (JP); Hiroshi Suenaga, Osaka (JP); Kohei Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 242 days.

(21) Appl. No.: 13/143,233

(22) PCT Filed: Nov. 1, 2010

(86) PCT No.: PCT/JP2010/006430
§ 371 (c)(1),
(2), (4) Date: Jul. 5, 2011

(87) PCT Pub. No.: WO2011/058714
PCT Pub. Date: May 19, 2011

(65) Prior Publication Data
US 2011/0268198 A1 Nov. 3, 2011

(30) Foreign Application Priority Data

Nov. 13, 2009 (JP) ................................. 2009-259618
Nov. 20, 2009 (JP) ................................. 2009-264506

(51) Int. Cl.
*H04B 3/00* (2006.01)
(52) U.S. Cl.
USPC ........... 375/257; 375/295; 375/316; 375/219; 375/220
(58) Field of Classification Search
USPC .................... 375/257, 295, 316, 219, 220
See application file for complete search history.

(56) References Cited

U.S. PATENT DOCUMENTS

| | | | |
|---|---|---|---|
| 5,684,479 A | 11/1997 | Hayashi | |
| 7,177,418 B2* | 2/2007 | Maclean et al. | 379/395.01 |
| 7,817,727 B2* | 10/2010 | Kumar et al. | 375/258 |
| 7,898,295 B1* | 3/2011 | Kasturirangan et al. | 326/86 |
| 2003/0089785 A1 | 5/2003 | Tashiro | |
| 2004/0013263 A1* | 1/2004 | Maclean et al. | 379/387.01 |
| 2005/0066077 A1* | 3/2005 | Shibata et al. | 710/33 |
| 2005/0088218 A1* | 4/2005 | Shibata et al. | 327/333 |
| 2006/0097753 A1* | 5/2006 | Shibata et al. | 326/83 |
| 2007/0182452 A1 | 8/2007 | Shibata et al. | |
| 2008/0022144 A1 | 1/2008 | Shibata et al. | |
| 2008/0034378 A1* | 2/2008 | Kumar et al. | 719/321 |

FOREIGN PATENT DOCUMENTS

| | | |
|---|---|---|
| JP | 8-46648 | 2/1996 |
| JP | 2002-183691 | 6/2002 |
| JP | 2005-236931 | 9/2005 |

OTHER PUBLICATIONS

International Search Report issued Feb. 8, 2011 in International (PCT) Application No. PCT/JP2010/006430.

* cited by examiner

*Primary Examiner* — Kenneth Lam
(74) *Attorney, Agent, or Firm* — Wenderoth, Lind & Ponack, L.L.P.

(57) ABSTRACT

In a communications system for differential signals, a driver circuit is connected to a receiver circuit by a pair of differential signal lines. When data is not being transmitted, the differential signal lines are maintained at a predetermined electric potential, and when data is to be transferred, a differential signal is output at predetermined electric potentials. The receiver circuit switches between a power-down state and a normal state when detecting states of the electric potentials of the differential signal lines.

12 Claims, 15 Drawing Sheets

DRIVER CIRCUIT, RECEIVER CIRCUIT, AND METHOD OF CONTROLLING A COMMUNICATIONS SYSTEM INCLUDING THE CIRCUITS

TECHNICAL FIELD

The present invention relates to differential serial transmission, and in particular to technology for reducing power consumption in a transmission and reception circuit.

BACKGROUND ART

In recent years, differential interfaces that perform differential serial transmission have become common to achieve high-speed transmission under strict constraints with regards to the number of Large Scale Integration (LSI) terminals or to noise from Electro Magnetic Interference (EMI). The driver circuit that transmits data and the receiver circuit that receives data in such a differential interface operate with a constant current supply and therefore consume power even when valid data is not being transmitted.

To address this problem, technology is necessary to limit current flowing to some or all of the circuits when valid data is not being transmitted. Patent Literature 1 discloses a structure for achieving such technology.

FIG. 15 shows the configuration of a conventional differential interface circuit according to Patent Literature 1. In FIG. 15, a driver circuit 900 is provided with a current driven driver 901 that performs differential transmission and a voltage driven driver 902 that performs single-ended transmission. A receiver circuit 903 is provided with a current/voltage conversion circuit 904, a comparator 905, and a power control circuit 906 and is connected to the driver circuit 900 via differential signal lines D+ and D−. In the driver circuit 900, the voltage driven driver 902 outputs a power-down electric potential and a wake-up electric potential. The voltage driven driver 902 provides the receiver circuit 903 with a power-down notification and a wake-up notification. Upon receipt of the power-down notification by the receiver 903, the power control circuit 906 controls the current flowing to at least one of the current/voltage conversion circuit 904 and the comparator 905.

CITATION LIST

[Patent Literature]

Patent Literature 1: Japanese Patent Application Publication No. 2005-236931

SUMMARY OF INVENTION

Technical Problem

Although power consumption is reduced during a power-down state, the interface circuit disclosed in Patent Literature 1 has the problem of additionally requiring provision of the voltage driven driver 902 to issue power-down and wake-up notifications to the receiver 903.

The present invention has been conceived in light of these problems, and it is an object thereof to provide a driver circuit and a receiver circuit that reduce power consumption during a power-down state and that switch between the power-down state and a normal state without use of a voltage driven driver, as well as to provide a control method used in a communications system that includes the driver circuit and the receiver circuit.

Solution to Problem

In order to solve the above problems, a receiver circuit according to the present invention is connected to a driver circuit by a pair of differential signal lines and comprises: a differential receiver configured to receive a differential signal transmitted by the driver circuit on the differential signal lines, the differential signal being coded with a predetermined transmission coding scheme; a detection circuit configured to detect that electric potentials of the differential signal lines have changed to a first condition, after being maintained at a predetermined electric potential, when the driver circuit transmits a first fixed differential signal by maintaining the differential signal lines respectively at different electric potentials for a period of time longer than a maximum period of time during which the differential signal lines have respectively fixed electric potentials according to the transmission coding scheme; and a receiver control unit configured to switch the differential receiver from a disable state to an enable state when the detection circuit detects the change to the first condition.

In order to solve the above problems, a driver circuit according to the present invention is connected to a receiver circuit by a pair of differential signal lines and comprises: a state maintaining circuit configured to maintain the differential signal lines at a predetermined electric potential while data is not being transferred; and a differential driver configured to transmit, before transmitting data coded with a predetermined transmission coding scheme as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme.

In order to solve the above problems, a control method according to the present invention is used in a communications system including a driver circuit and a receiver circuit connected by a pair of differential signal lines, and the control method comprises the steps of: a state maintaining step in which the driver circuit maintains the differential signal lines at a predetermined electric potential while data is not being transferred; a transmission step in which the driver circuit transmits, before transmitting data coded with a predetermined transmission coding scheme as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme; a reception step in which the receiver circuit receives the differential signal on the differential signal lines; a detection step in which the receiver circuit detects that electric potentials of the differential signal lines have changed to a first condition, after being maintained at a predetermined electric potential, when the first fixed differential signal is transmitted; and a receiver control step of switching the receiver circuit that performs the reception step from a disable state to an enable state when the change to the first condition is detected in the detection step.

Advantageous Effects of Invention

The present invention provides a communications system for controlling, via a driver circuit with a simplified circuit structure, the switching of the receiver circuit between a normal state and a power-down state in order to reduce power

DESCRIPTION OF EMBODIMENTS

<Embodiment 1>
<Outline>

Figure 1:
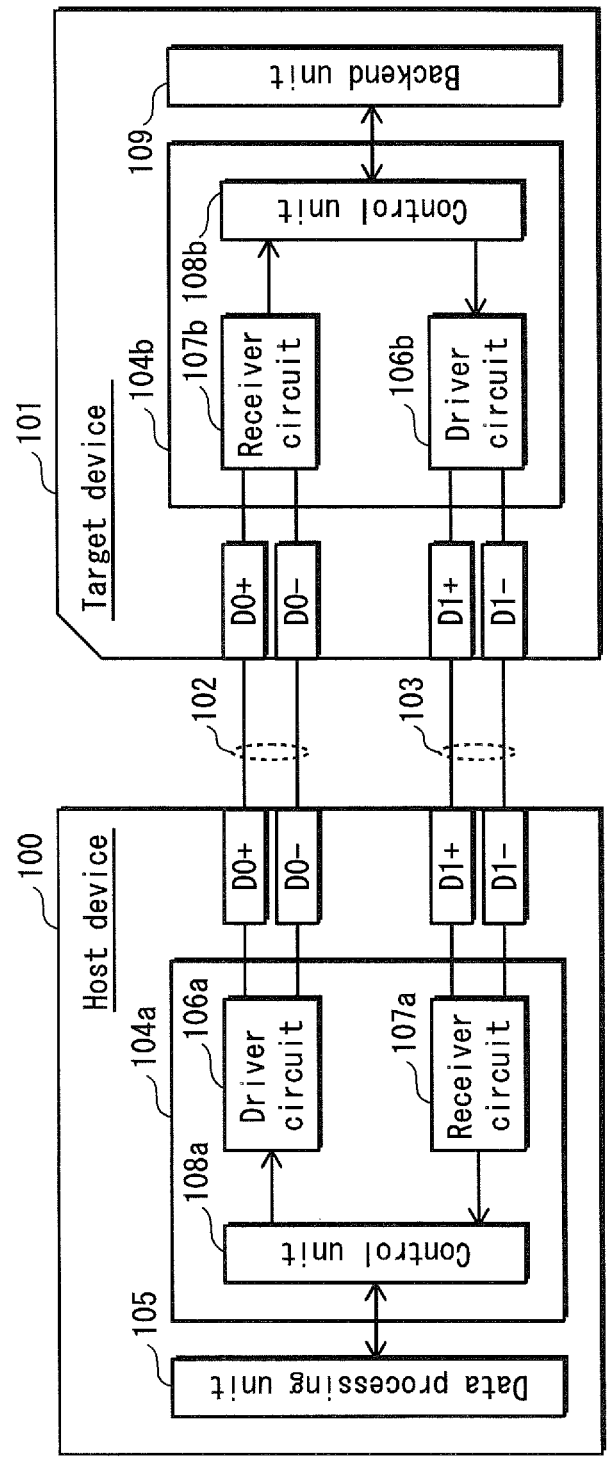
FIG. 1 shows the overall structure of a communications system according to Embodiment 1.

FIG. 1 shows the overall structure of a communications system according to Embodiment 1 of the present invention.

The communications system in Embodiment 1 includes a host device 100 and a target device 101. The host device 100 and the target device 101 are connected by a pair of differential signal lines 102 and a pair of differential signal lines 103. The pair of differential signal lines 102 is composed of a D0+ signal line and a D0− signal line that carries a signal having a phase opposite to the signal on the D0+ signal line. The pair of differential signal lines 103 is similarly composed of a D1+ signal line and a D1− signal line. A driver circuit 106a in the host device 100 and a receiver circuit 107b in the target device 101 are connected by the differential signal lines 102. When transmitting data, the driver circuit 106a outputs a differential signal of the difference between a signal of the high electric potential $V_{DP}$ (the positive potential) and a signal of the low electric potential $V_{DN}$ (the negative potential).

When not transmitting and receiving data, the driver circuit 106a and the receiver circuit 107b enter a power-down state for limiting current flowing to part of the circuits, in order to reduce power consumption. During the power-down state, a signal of 0 V is output to both of the differential signal lines 102, and the differential amplitude becomes 0. The driver circuit 106a is in a normal state, in which the flow of current to the circuits is not limited, when target data for transmission is generated in the host device 100. The receiver circuit 107b is in a normal state when the receiver circuit 107b is notified that data for reception exists, i.e. that data for transmission by the driver circuit 106a exists. Specifically, when data for transmission is generated in the host device 100, then before transmitting the data, the driver circuit 106a outputs, for a predetermined period of time, a differential low fixed signal by continually outputting a signal of the negative electric potential $V_{DN}$ from the D0+ signal line and a signal of the positive electric potential $V_{DP}$ from the D0− signal line. In this way, the electric potential of the D0− signal line transitions to the positive electric potential $V_{DP}$. The transmission data is 8 b/10 b encoded. In this encoding scheme, a signal of the same electric potential is not output for longer than the transmission time corresponding to five bits. The predetermined time is the time corresponding to six bits or longer, and during this time a differential signal with the same electric potentials is continuously output.

On the other hand, the receiver circuit 107b is provided with a detection circuit. The receiver circuit 107b enters the normal mode when the detection circuit detects, based on output of the differential low fixed signal from the driver circuit 106a, that a differential amplitude, i.e. a difference in electric potentials, between the D0+ signal line and the D0− signal line exists and has reached a threshold equal to or greater than $V_{TH}$. In this way, the driver circuit 106a notifies the receiver circuit 107b of the timing to transition from the power-down state to the normal state.

<Detailed Structure>

The following describes the detailed structure of the communications system in FIG. 1, using the example of a personal computer as the host device 100 and a semiconductor memory card as the target device 101. In the following description, the numbers 0 and 1 in D0+, D0−, D1+, and D1− are omitted, with reference only being made to D+ and D−.

The host device 100 is provided with an interface circuit 104a and a data processor 105. Furthermore, the interface circuit 104a is provided with a driver circuit 106a, a receiver circuit 107a, and a control unit 108a.

The data processor 105 is the upper layer of the interface circuit 104a, corresponding to the physical layer and the data link layer during communication. The data processor 105 has the function of processing data in response to user operation. The data processor 105 also has the function of processing data that is received during reception and transmission of data between the receiver circuit 107a in the host device 100 and a driver circuit 106b in the target device 101.

The target device 101 is provided with an interface circuit 104b and a backend unit 109. The interface circuit 104b in the target device 101 has the same structure as the interface circuit 104a in the host device 100. The driver circuit 106b, the receiver circuit 107b, and a control unit 108b respectively have the same structure as the driver circuit 106a, the receiver circuit 107a, and the control unit 108a in the interface circuit 104a.

The backend unit 109 is the upper layer of the interface circuit 104b, corresponding to the physical layer and the data link layer during communication. The backend unit 109 has the function of processing received data. The backend unit 109 also has the function of processing data that is transmitted during reception and transmission of data between the receiver circuit 107a in the host device 100 and the driver circuit 106b in the target device 101. A non-volatile memory and a memory controller are used as the backend unit 109.

The interface circuit 104a and the interface circuit 104b are connected in a symmetric fashion between the host device 100 and the target device 101. Therefore, the following description focuses on functions during transmission and reception of data between the driver circuit 106a and the receiver circuit 107b, which are connected by the differential signal lines 102.

Note that in the following description of the detailed structure, the letters a and b are omitted, with reference only being made to the numbers 106, 107, and 108.

<Detailed Structure of Driver Circuit 106>

Figure 2:
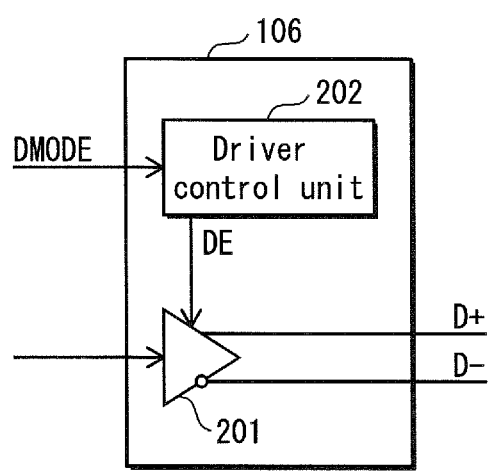
FIG. 2 shows the detailed structure of a driver circuit 106.

FIG. 2 shows the detailed structure of the driver circuit 106 according to Embodiment 1.

The driver circuit 106 is provided with a differential driver 201 and a driver control unit 202.

Figure 3:
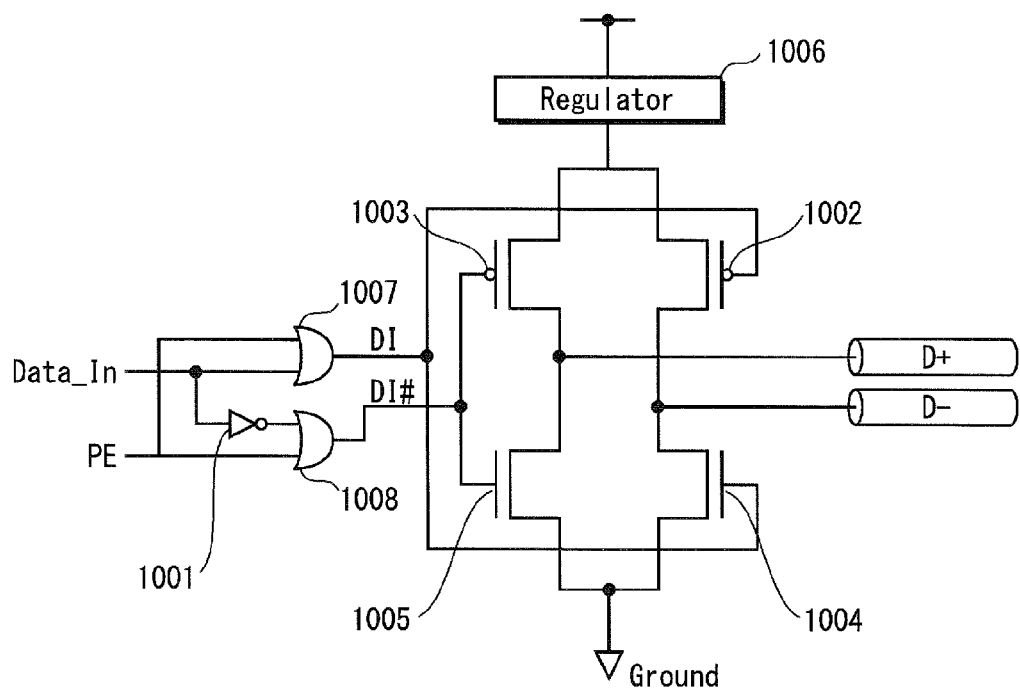
FIG. 3 shows the detailed structure of a differential driver 201.

FIG. 3 shows the detailed structure of the differential driver 201.

The differential driver 201 is provided with an inverter 1001, a P channel transistor 1002, a P channel transistor 1003, an N channel transistor 1004, an N channel transistor 1005, a regulator 1006, an OR circuit 1007, and an OR circuit 1008. The differential driver 201 has the functions of transmitting a differential signal on the differential signal lines and of maintaining the differential signal lines at 0 V during the power-down state.

Figure 7:
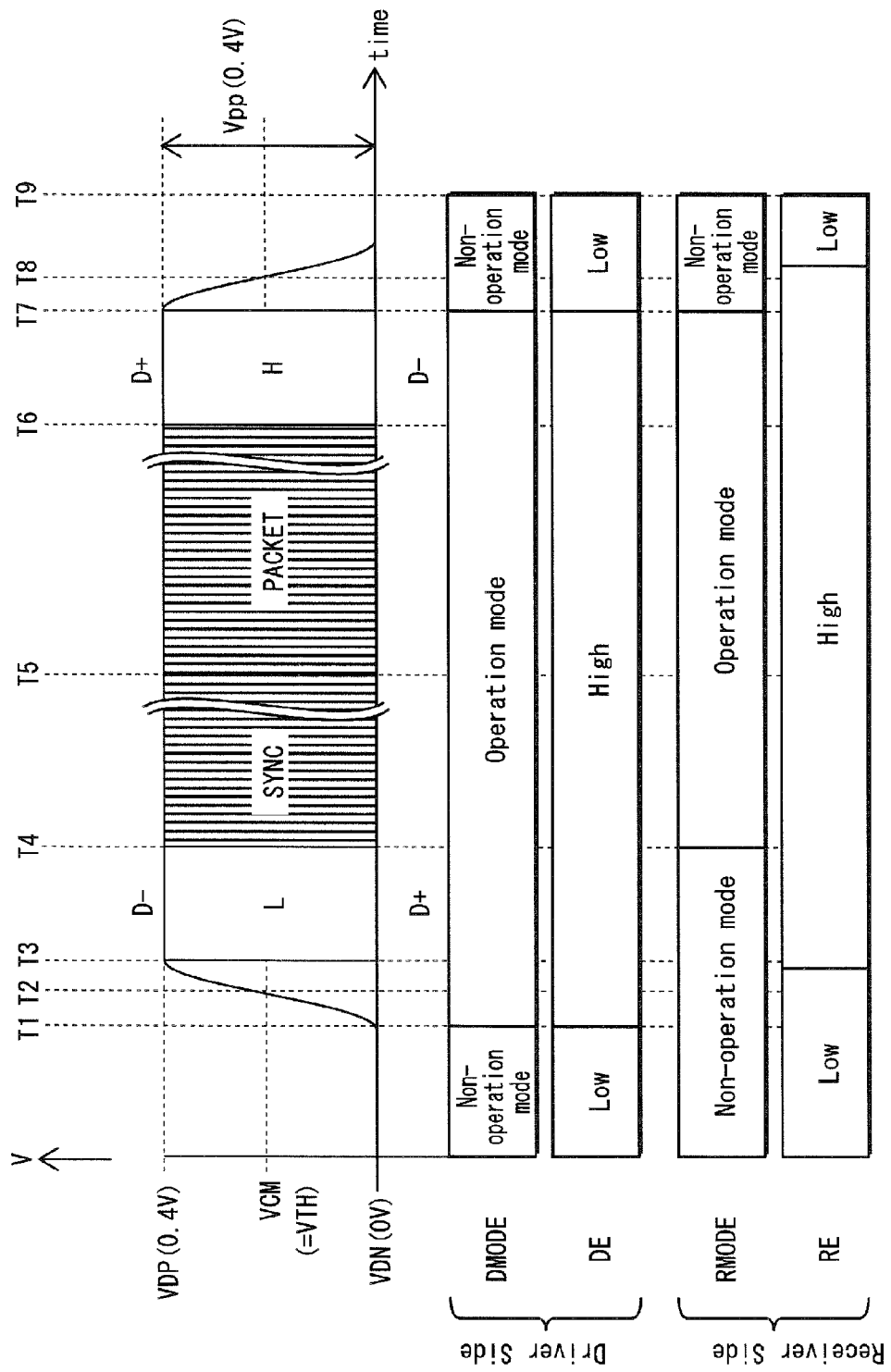
FIG. 7 is an operation timing diagram for an interface circuit.

Specifically, the differential driver 201 achieves the above functions as follows. As shown in FIG. 7, the differential driver 201 outputs a differential signal of the difference between the positive electric potential $V_{DP}$ and the negative electric potential $V_{DN}$, as determined by a common mode electric potential $V_{CM}$ (in this case, 0.2 V), which is the electric potential at the center of the differential signal, and a differential amplitude $V_{PP}$ (in this case, 0.4 V).

A pull-down enable signal PE is the inverse of a driver enable signal DE (described below) and is low during the normal state. An input signal Data_In, which is a bit in the transmission data sequence, becomes a signal DI and a complementary input signal DI#, DI being the input signal Data_In as is, and DI# being the input signal Data_In after inversion by the inverter 1001. When the input signal Data_In is high, DI is high, the P channel transistor 1002 is turned off, and the N channel transistor 1004 is turned on. Therefore, the D− signal line is grounded, and a signal of 0 V (the negative electric potential $V_{DN}$ of the differential signal) is output. At this point, DI# becomes low, the P channel transistor 1003 is turned on, and the N channel transistor 1005 is turned off. Therefore, the D+ signal line outputs a signal of 0.4 V (the positive electric potential $V_{DP}$ of the differential signal), 0.4 V being the output voltage of the regulator 1006 which acts as the voltage supply. The above-described differential signal, in which a signal of 0 V is output on the D− signal line and a signal of 0.4 V is output on the D+ signal line, is referred to as a high signal. Similarly, when the input signal Data_In is low, a signal of 0 V is output on the D+ signal line and a signal of 0.4 V is output on the D− signal line. Such a differential signal is referred to as a low signal. During the power-down state, the driver enable signal DE becomes low, and therefore the pull-down enable signal PE becomes high. At this point, regardless of the input signal Data_In, DI and DI# are both high. The P channel transistor 1002 and the P channel transistor 1003 are both turned off, and the N channel transistor 1004 and the N channel transistor 1005 are both turned on. Therefore, the D+ signal line and the D− signal line are both grounded and both output a signal of 0 V. Furthermore, at this point power consumption in the differential driver 201 is reduced, since no current flows in the regulator 1006.

The driver control unit 202 has the function of controlling an enable state and a disable state of the differential driver 201 in response to input of a driver mode control signal DMODE (described below). Specifically, when the driver mode control signal DMODE indicates operation mode due to a link controller 402 (described below), i.e. when there is target data for transmission, the driver control unit 202 sets the driver enable signal DE to high. The pull-down enable signal PE thus becomes low, and the differential driver 201 enters the enable state. On the other hand, when the driver mode control signal DMODE indicates non-operation mode, i.e. when there is no target data for transmission, the driver control unit 202 sets the driver enable signal DE to low. The pull-down enable signal PE thus becomes high, and the differential driver 201 enters the disable state. The enable state of the differential driver 201 refers to a state in which a differential signal can be output. In this state, power is consumed, since current steadily flows in the regulator 1006 of the differential driver 201. The disable state of the differential driver 201 refers to a state in which a differential signal cannot be output. Power consumption is reduced, since no current flows in the regulator 1006. In the driver circuit 106, the state in which the differential driver 201 is disabled is referred to as the power-down state, and the state in which the differential driver 201 is enabled is referred to as the normal state.

<Detailed Structure of Receiver Circuit 107>

Figure 4:
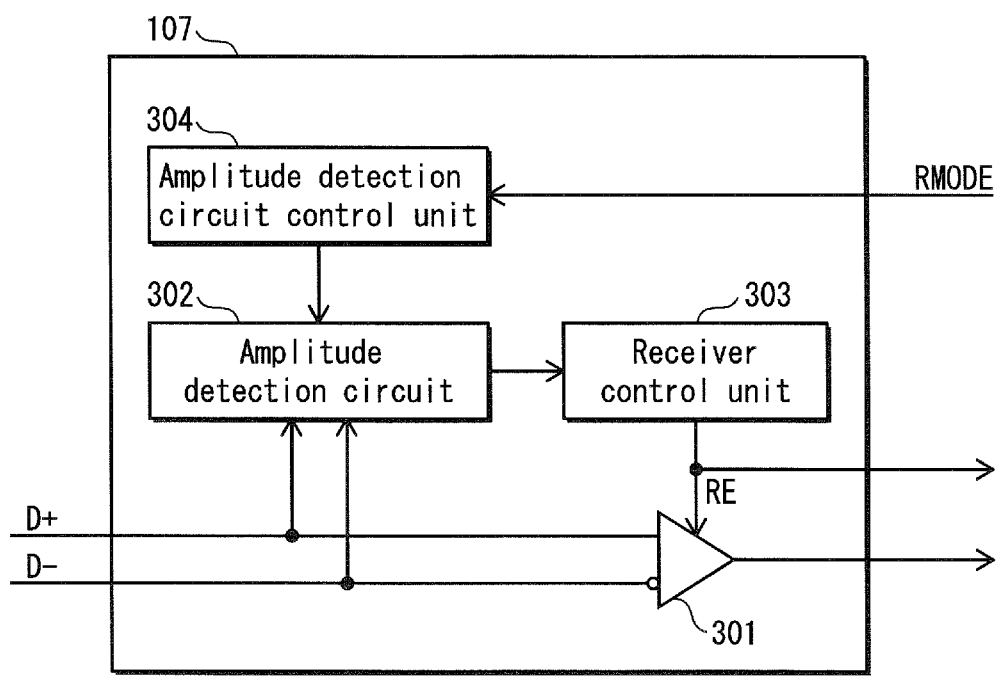
FIG. 4 shows the detailed structure of a receiver circuit 107.

FIG. 4 shows the detailed structure of the receiver circuit 107 according to Embodiment 1.

The receiver circuit 107 is provided with a differential receiver 301, an amplitude detection circuit 302, a receiver control unit 303, and an amplitude detection circuit control unit 304.

The differential receiver 301 is composed of a differential amplifier, the differential amplifier being formed by transistors, and has the function of receiving a differential signal on the differential signal lines.

While not shown in the figures, a terminating resistor of approximately 100Ω is connected between the D+ signal line and the D− signal line before the differential receiver 301 in order to achieve impedance matching of the differential signal lines.

The amplitude detection circuit 302 is formed by a comparator to which the D+ signal line and the D− signal line are connected and has the function of detecting the differential amplitude between the D+ signal line and the D− signal line.

Specifically, the amplitude detection circuit 302 is connected at the positive terminal to the D− signal line and at the negative terminal to the D+ signal line. The amplitude detection circuit 302 detects the differential amplitude, in this case the difference in electric potentials yielded by subtracting the electric potential input at the negative terminal from the electric potential input at the positive terminal The amplitude detection circuit 302 outputs "high" if the differential amplitude is equal to or greater than a threshold $V_{TH}$, in this case 0.2 V, and outputs "low" if the differential amplitude is smaller than the threshold $V_{TH}$ (including negative values).

It is preferable for the amplitude detection circuit 302 to be provided with hysteresis characteristics for stable detection of the differential signal lines.

The receiver control unit 303 has the function of controlling the enable state and the disable state of the differential receiver 301. Specifically, upon receiving an output of "high" from the amplitude detection circuit 302, i.e. when the amplitude detection circuit 302 detects a differential amplitude equal to or greater than the threshold $V_{TH}$, the receiver control unit 303 sets a receiver enable signal RE to high, and the differential receiver 301 enters the enable state. Upon receiving an output of "low" from the amplitude detection circuit 302, i.e. when the amplitude detection circuit 302 detects a differential amplitude smaller than the threshold $V_{TH}$, the receiver control unit 303 sets the receiver enable signal RE to low, and the differential receiver 301 enters the disable state.

The enable state of the differential receiver 301 refers to a state in which a differential signal can be received. In this state, power is consumed, since current steadily flows in the differential receiver 301. The disable state of the differential receiver 301 refers to a state in which a differential signal cannot be received. Power consumption is reduced, since no current flows. In the receiver circuit 107, the state in which the differential receiver 301 is disabled is referred to as the power-down state, and the state in which the differential receiver 301 is enabled is referred to as the normal state.

The amplitude detection circuit control unit 304 has the function of controlling the enable state and the disable state of the amplitude detection circuit 302. The disable state of the amplitude detection circuit 302 refers to a state in which amplitude detection results are masked, thus disabling the amplitude detection results. In this state, the amplitude detection circuit 302 is considered to continually detect that the differential amplitude is equal to or greater than the threshold $V_{TH}$. This prevents the amplitude detection circuit 302 from detecting, while in the normal state, that the amplitude of the differential signal has become smaller than the threshold $V_{TH}$ and switching from the normal state to the power-down state.

<Detailed Structure of Control Unit 108>

Figure 5:
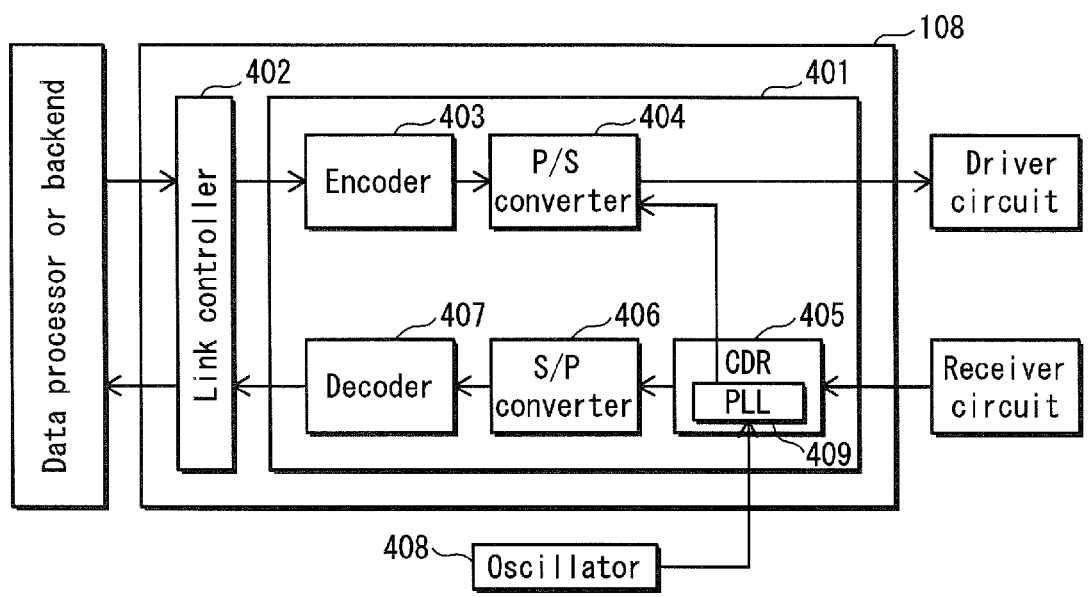
FIG. 5 shows the detailed structure of a control unit 108.

FIG. 5 shows the detailed structure of the control unit 108.

The control unit 108 includes a data converter 401 and a link controller 402.

The data converter 401 further includes an encoder 403, a parallel to serial converter 404, a Clock Data Recovery (CDR) circuit 405, a serial to parallel converter 406, and a decoder 407.

The link controller 402 controls the entire interface circuit and has the function of controlling the driver mode control signal DMODE and a receiver mode control signal RMODE.

Figure 6A:
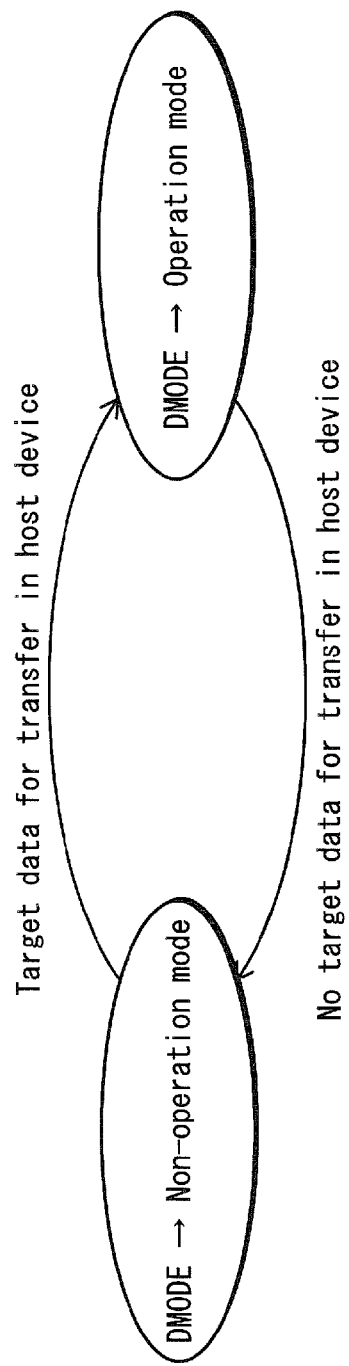
FIGS. 6A and 6B show a state transition diagram for a driver mode control signal DMODE and a receiver mode control signal RMODE.

FIG. 6A shows a state transition diagram for the driver mode control signal DMODE.

The link controller 402 sets the driver mode control signal DMODE to non-operation mode when there is no target data for transmission in the host device 100 and to operation mode when there is target data for transmission.

Figure 6B:
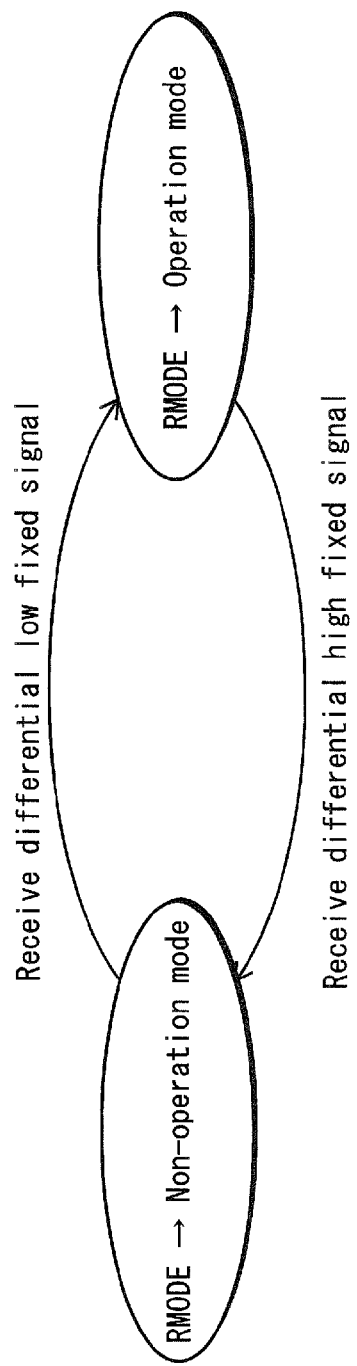

FIG. 6B shows a state transition diagram for the receiver mode control signal RMODE.

The link controller 402 sets the receiver mode control signal RMODE to operation mode when the receiver circuit 107b receives a differential low fixed signal in which a signal of the negative electric potential $V_{DN}$ is continually output from the D+ signal line and a signal of the positive electric potential $V_{DP}$ is continually output from the D− signal line. The link controller 402 sets the receiver mode control signal RMODE to non-operation mode when the receiver circuit 107b receives a differential high fixed signal in which a signal of the positive electric potential $V_{DP}$ is continually output from the D+ signal line and a signal of the negative electric potential $V_{DN}$ is continually output from the D− signal line. The control unit 108b notifies the backend unit 109 of the receiver mode control signal RMODE. The backend unit 109 does not process received data when the receiver mode control signal RMODE is in non-operation mode.

The encoder 403 has the function of converting eight bits of parallel transmission data received from the link controller 402 into 10 bits of encoded data. The encoding scheme for transmission is 8 b/10 b encoding. When encoding with this scheme, no more than five bits in a row have the same value in 10 bits of encoded data. A synchronization symbol is also output. In 8 b/10 b encoding, the synchronization symbol is not a D symbol as used during normal data transmission, but rather is a special K symbol for control, or a combination of D and K symbols. For example, one type of special K symbol, K28.5, is called a comma character and is used as a synchronization symbol since it is a pattern not generated by combination of any two 8 b/10 b symbols.

The parallel to serial converter 404 has the function of converting 10 bits of encoded data converted by the encoder 403 into serial transmission data based on a data clock generated by a PLL circuit 409 (described below). The parallel to serial converter 404 outputs the serial transmission data to the driver circuit 106a.

An oscillator 408 is located in the device and has the function of generating a reference clock.

The PLL circuit 409 has the function of generating, from the reference clock generated by the oscillator 408, a high-speed data clock used for data transmission and reception.

A CDR circuit 405 includes the PLL circuit 409 and has the function of aligning the phase of the data clock and the edge of the serial data in order to remove jitter (a shift in the signal on the time axis) included in the serial data received by the receiver circuit 107b. The serial data received by the receiver circuit 107b includes jitter, since it is received by the receiver circuit 107b after traversing the differential signal lines and input/output terminals.

The serial to parallel converter 406 has the functions of detecting a synchronization symbol added before the valid data, performing symbol synchronization, and converting subsequent valid data to 10 correct bits of encoded data. It is possible to detect the differential low fixed signal and the differential high fixed signal since these signals are output from the differential signal lines for the predetermined time as signals of the same electric potentials, and therefore are received as encoded data consisting entirely of zeros and ones, a form of data that is not generated in the 8 b/10 b encoding scheme. When detecting the differential low fixed signal and the differential high fixed signal, the serial to parallel converter 406 notifies the link controller 402 accordingly.

The decoder 407 has the function of decoding 10 bits of encoded data, converted by the serial to parallel converter 406 in accordance with the 8 b/10 b encoding scheme, into eight bits of original data.

<Operations>

The following describes operations of the communications system according to Embodiment 1 with reference to the structure of Embodiment 1 as shown in FIGS. 1 through 5. FIG. 7 is an operation timing diagram for the interface circuit according to Embodiment 1. The interface circuits in the communications system shown in FIG. 1 are connected in a symmetric fashion between the host device 100 and the target device 101. Therefore, the following only describes operations of the driver circuit 106a and the receiver circuit 107b, connected by the pair of differential signal lines 102.

While there is no target data for transmission to the host device 100, the driver circuit 106a is in the power-down state. In other words, the differential driver 201 is in the disable state, and both the D+ signal line and the D− signal line are grounded to become 0 V, yielding a differential amplitude of zero. At this point, the receiver circuit 107b is also in the power-down state.

At time T1, when target data for transmission is generated in the host device 100, the control unit 108a causes the driver mode control signal DMODE to transition to operation mode. When the driver mode control signal DMODE transitions to operation mode, the driver control unit 202 switches the driver enable signal DE to high, and the differential driver 201 enters the enable state. The differential driver 201 then outputs the differential low fixed signal. The D− signal line transitions to near 0.4 V (the positive electric potential $V_{DP}$ of the differential signal), whereas the D+ signal line remains near 0 V (the negative electric potential $V_{DN}$ of the differential signal).

At time T2, while the D− signal line is transitioning to 0.4 V, the amplitude detection circuit 302 detects that the amplitude of the pair of differential signal lines 102 has become equal to or greater than the threshold $V_{TH}$ of 0.2 V. The receiver control unit 303 sets the receiver enable signal RE to high, and the differential receiver 301 enters the enable state.

At time T3, when the D− signal line reaches 0.4 V, the differential receiver 301 receives the differential low fixed signal.

At time T4, the driver circuit 106a starts to transmit a synchronization symbol before the target data for transmission. Since the receiver circuit 107b receives the differential low fixed signal, the receiver mode control signal RMODE is set to the operation mode by the control unit 108b. When the receiver mode control signal RMODE enters the operation mode, the target device 101 enters a state in which it can process the received data. Furthermore, the amplitude detection circuit control unit 304 sets the amplitude detection circuit 302 to disable mode. Subsequently, the synchronization symbol is received, and symbol synchronization is performed.

At time T5, the driver circuit 106a finishes transmitting the predetermined synchronization symbol and then transmits the target data in packets. The receiver circuit 107b receives the packets. In this context, a packet is a data sequence in which the recipient can distinguish the start and the end of valid data, since the valid data has, at either end, a special K symbol with the function of Start of Packet (SOP) or End of Packet (EOP).

At time T6, the driver circuit 106a finishes transmitting packets and transmits the differential high fixed signal. In the receiver circuit 107b, the differential receiver 301 receives the differential high fixed signal.

At time T7, the receiver circuit 107b receives the differential high fixed signal. When the control unit 108b is notified of receipt of the differential high fixed signal, the control unit 108b sets the receiver mode control signal RMODE to the non-operation mode. When the receiver mode control signal RMODE enters the non-operation mode, the amplitude detection circuit control unit 304 sets the amplitude detection circuit 302 to the enable state.

At time T8, the amplitude detection circuit 302 detects that the amplitude of the pair of differential signal lines 102 has gone below the threshold $V_{TH}$ of 0.2 V. The receiver control unit 303 sets the receiver enable signal RE to low, and the differential receiver 301 enters the disable state.

The amplitude detection circuit 302 quickly detects, in a stable state, that the amplitude is less than the threshold $V_{TH}$ by detecting the differential high fixed signal, i.e. the 0.4 V signal of the D+ signal line and the 0 V signal of the D− signal line continuously output from time T6 to time T7.

The driver circuit 106a thereby notifies the receiver circuit 107b of the timing of the switch between the power-down state and the normal state with a simplified structure that does not use a voltage driven driver.

<Embodiment 2>

In Embodiment 1, the driver circuit 106a maintains the electric potential of each of the differential signal lines 102 at 0 V while data is not being transmitted. In Embodiment 2, on the other hand, while data is not being transmitted, the electric potential of each of the differential signal lines 102 is maintained at a pull-up electric potential $V_{PU}$ which is higher than the positive electric potential $V_{DP}$ of the differential signal. The pull-up electric potential $V_{PU}$ is set to 1.2 V in Embodiment 2.

<Structure>

In the communications system in Embodiment 2, the driver circuit 106a and the receiver circuit 107b in the communications system in FIG. 1 are respectively replaced with a driver circuit 500 (described below) shown in FIG. 8 and a receiver circuit 600 (described below) shown in FIG. 10.

Figure 8:
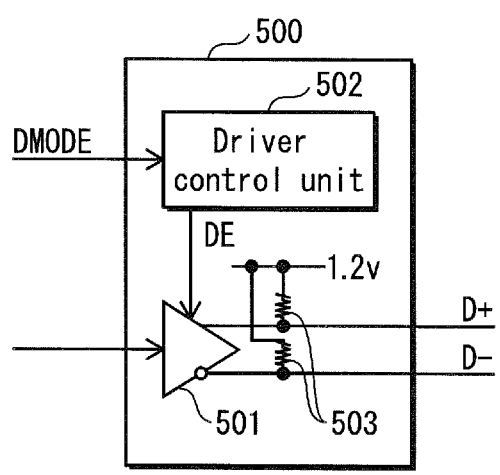
FIG. 8 shows the detailed structure of a driver circuit 500 according to Embodiment 2.

FIG. 8 shows the detailed structure of the driver circuit 500 according to Embodiment 2. The driver circuit 500 according to Embodiment 2 is provided with a differential driver 501, a driver control unit 502, and pull-up resistors 503.

Figure 9:
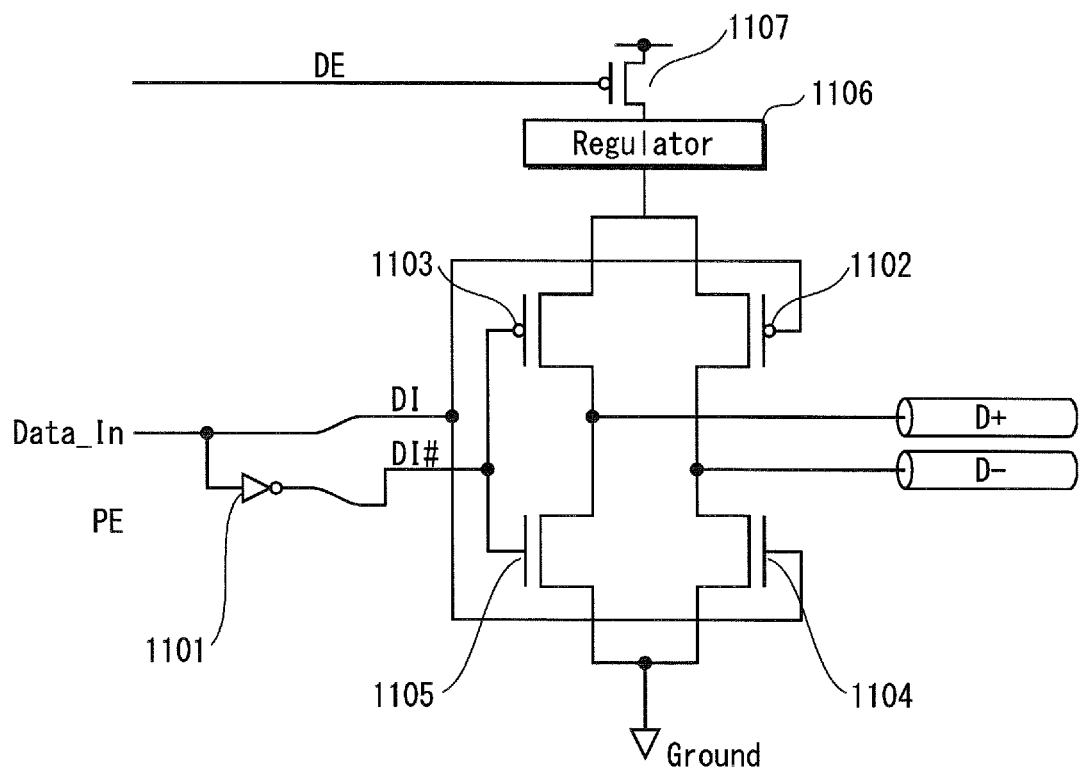
FIG. 9 shows the detailed structure of a differential driver 501.

FIG. 9 shows the detailed structure of the differential driver 501.

The differential driver 501 is provided with an inverter 1101, a P channel transistor 1102, a P channel transistor 1103, an N channel transistor 1104, an N channel transistor 1105, a regulator 1106, and a transistor 1107. The differential driver 501 has the function of transmitting a differential signal on the differential signal lines. The structure from the inverter 1101 to the regulator 1106 is similar to the structure from the inverter 1001 to the regulator 1006 in the differential driver 201.

When in the normal state, i.e. when the driver enable signal DE is high, the differential driver 501 outputs a differential high signal when the input signal Data_In is high and outputs a differential low signal when the input signal Data_In is low.

When the driver enable signal DE is low, the transistor 1107 is turned off, and the pair of differential signal lines 102 enter a high impedance state. At this point, the electric potentials of the differential signal lines 102 are maintained at the pull-up electric potential $V_{PU}$ by the pull-up resistors 503 which are connected to a 1.2 V power source. Furthermore, at this point power consumption in the differential driver 501 is reduced, since no current flows in the regulator 1106.

The driver control unit 502 has similar functions as the driver control unit 202.

The pull-up resistors 503 are each connected at one end to one of the differential signal lines 102 and at the other end to a 1.2 V power source. The pull-up resistors 503 have the function of maintaining the differential signal lines 102 at the pull-up electric potential $V_{PU}$ when the differential signal lines 102 are in the high impedance state. Note that in order to reduce the consumption of current in the power-down state, it is preferable that the resistance of the pull-up resistors 503 be between several dozen kΩ and 100 kΩ or higher.

Figure 10:
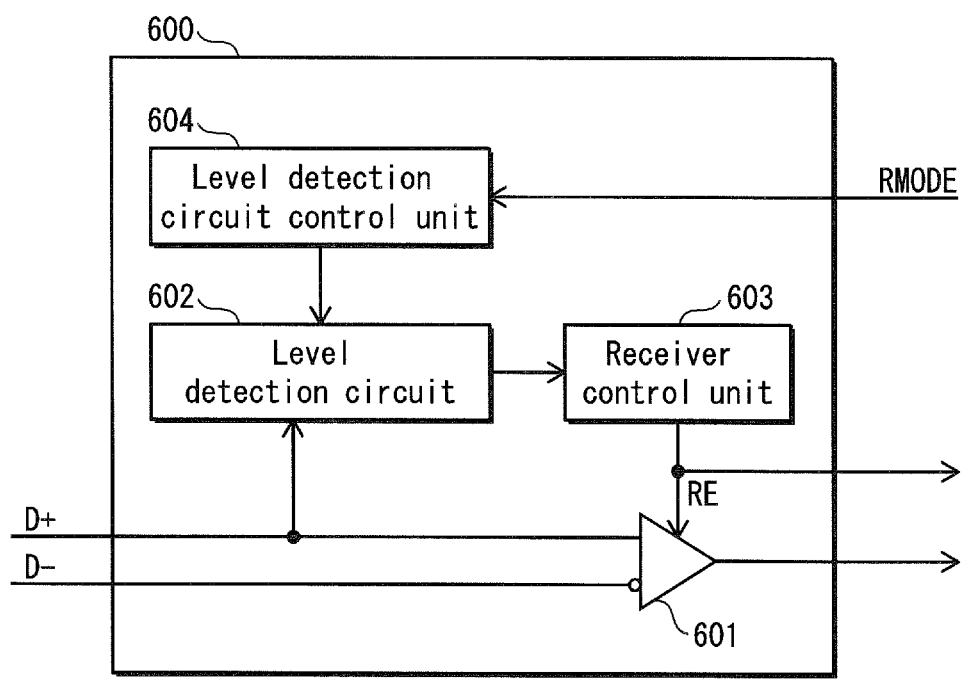
FIG. 10 shows the detailed structure of a receiver circuit 600.

FIG. 10 shows the detailed structure of the receiver circuit 600 according to Embodiment 2. The receiver circuit 600 in Embodiment 2 is provided with a differential receiver 601, a level detection circuit 602, a receiver control unit 603, and a level detection circuit control unit 604.

The level detection circuit 602 is composed of digital circuitry such as a CMOS buffer and has the function of detecting the electric potential of the D+ signal line. Specifically, the level detection circuit 202 detects that the differential signal lines are at the pull-up electric potential $V_{PU}$ when the electric potential of the D+ signal line is equal to or greater than a threshold electric potential $V'_{TH}$ set between the pull-up electric potential $V_{PU}$ and the positive electric potential $V_{DP}$ of the differential signal, and the level detection circuit 202 detects that the differential signal lines are not at the pull-up electric potential $V_{PU}$ when the electric potential of the D+ signal line is less than the threshold electric potential $V'_{TH}$. It is preferable for the level detection circuit 602 to be provided with hysteresis characteristics for stable detection of the differential signal lines.

The level detection circuit control unit 604 has the function of controlling the enable state and the disable state of the level detection circuit 602. Specifically, the level detection circuit control unit 604 sets the level detection circuit 602 to the enable state while the receiver mode control signal RMODE indicates the non-operation mode and to the disable state while the receiver mode control signal RMODE indicates the operation mode.

The disable state of the level detection circuit 602 refers to a state in which level detection results are masked, thus disabling the level detection results. In this state, the level detection circuit 602 is considered to continually detect that the differential signal lines 102 are not at the pull-up electric potential $V_{PU}$. This prevents the level detection circuit 602 from detecting the differential signal in the normal state and switching from the normal state to the power-down state.

<Operations>

Figure 11:
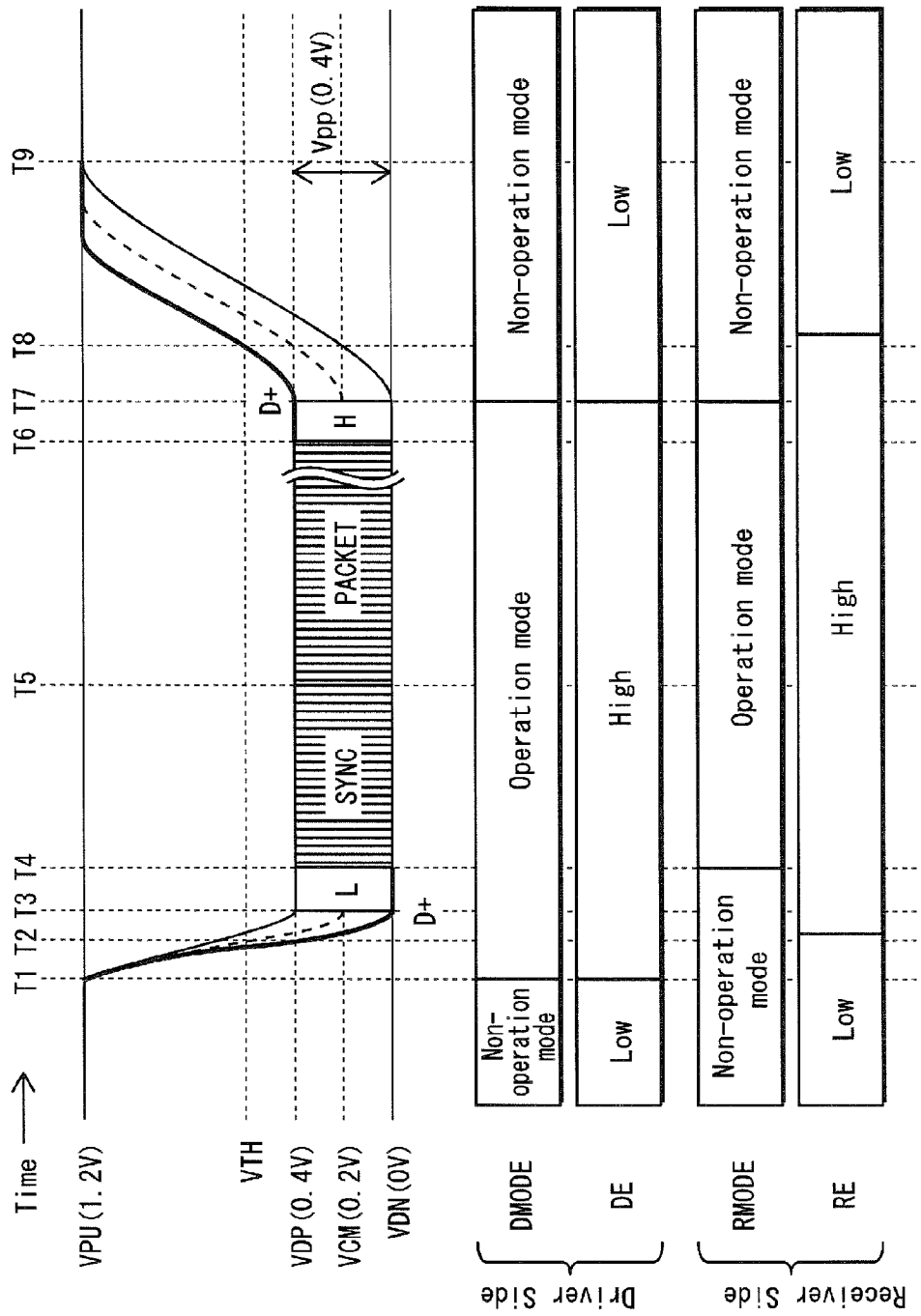
FIG. 11 is an operation timing diagram for the interface circuit.

FIG. 11 is an operation timing diagram for the interface circuit according to Embodiment 2.

In the host device 100, when there is no target data for transmission, the driver circuit 500 is in the power-down state, during which the differential signal lines 102 are maintained at the pull-up electric potential $V_{PU}$ of 1.2 V by the pull-up resistors 503. At this point, the receiver circuit 600 is also in the power-down state.

At time T1 in FIG. 11, when target data for transmission is generated in the host device 100, the control unit 108a causes the driver mode control signal DMODE to transition to operation mode. When the driver mode control signal DMODE transitions to operation mode, the driver control unit 502 switches the driver enable signal DE to high, and the differential driver 501 enters the enable state. Upon entering the enable state, the differential driver 501 outputs the differential low fixed signal.

At time T2, while the D+ signal line is transitioning to 0V, when the level detection circuit 602 detects that the electric potential of the D+ signal line has become lower than the threshold electric potential $V'_{TH}$, the receiver control unit 603 sets the receiver enable signal RE to high, and the differential receiver 601 enters the enable state. Since a signal of 0V, which is a lower electric potential, continues to be output from the D+ signal line, the electric potential transitions without bit transitioning. Therefore, the receiver circuit 600 detects that the electric potential of the differential signal lines has transitioned below the threshold electric potential $V'_{TH}$ more reliably than detecting the D− signal line, on which a 0.4 V signal is output. Furthermore, the receiver circuit 600 stably detects the electric potential since bit transition does not occur.

At time T3, when the electric potential of the D+ signal line reaches 0 V, and the electric potential of the D− signal line reaches 0.4 V, the receiver circuit 600 receives the differential low fixed signal.

At time T4, the driver circuit 500 starts to transmit a synchronization symbol before the target data for transmission. When the receiver circuit 600 receives the differential low fixed signal, the control unit 108b sets the receiver mode control signal RMODE to the operation mode, and the target device 101 enters a state in which it can process the received data. Subsequently, the synchronization symbol is received, and symbol synchronization is performed.

At time T5, the driver circuit 500a finishes transmitting the predetermined synchronization symbol and then transmits the data in packets. The receiver circuit 600 receives the packets.

At time T6, the driver circuit 500 finishes transmitting packets and starts to transmit the differential high fixed signal. The receiver circuit 600 receives the differential high fixed signal.

At time T7, the driver circuit 500 finishes transmitting the differential high fixed signal, and the control unit 108a sets the driver mode control signal DMODE to the non-operation mode. Upon the driver mode control signal DMODE entering the non-operation mode, the driver control unit 502 sets the driver enable signal DE to low, and the differential driver 501 enters the disable state. Subsequently, the D+ signal line starts to transition from near 0.4 V to near the pull-up electric potential $V_{PU}$ of 1.2 V. The receiver circuit 600 receives the differential high fixed signal. When the control unit 108b is notified of receipt of the differential high fixed signal, the control unit 108b sets the receiver mode control signal RMODE to the non-operation mode, and the target device 101 does not process subsequently received data. This prevents data that is received during an indeterminate period from T7 to T8 from mistakenly being processed.

At time T8, the level detection circuit 602 detects that the electric potential of the D+ signal line has become equal to or greater than the threshold electric potential $V'_{TH}$, the receiver control unit 603 sets the receiver enable signal RE to low, and the differential receiver 601 enters the disable state.

The driver circuit 500 thereby notifies the receiver circuit 600 of the timing of the switch between the power-down state and the normal state with a simplified structure that does not use a voltage driven driver.

<Supplementary Explanation>

A driver circuit and a receiver circuit according to the present invention, as well as a method of controlling a communications system including the driver circuit and the receiver circuit, have been described in Embodiments 1 and 2. However, the present invention is of course not limited to the communications system described in the Embodiments, and the exemplified communications system can be modified in the following ways.

(1) In the Embodiments, the driver circuit outputs the differential low fixed signal when transitioning from the power-down state to the normal state and outputs the differential high fixed signal when transitioning from the normal state to the power-down state. However, the driver circuit may output the differential high fixed signal when transitioning from the power-down state to the normal state and output the differential low fixed signal when transitioning from the normal state to the power-down state. In Embodiment 2, the receiver circuit 600 thus more reliably detects that the electric potential of the differential signal lines has become lower than the threshold electric potential $V'_{TH}$ by detecting the electric potential of the D− signal line rather of than the D+ signal line. Furthermore, when the transition to the pull-up electric potential $V_{PU}$ occurs, in order to start transitioning from the positive electric potential $V_{DP}$ of the differential signal, the receiver circuit 600 detects that the electric potential has become equal to or greater than the threshold electric potential $V'_{TH}$ more quickly than when detecting the D+ signal line.

(2) The driver circuit does not have to output the differential low fixed signal and the differential high fixed signal.

Figure 12:
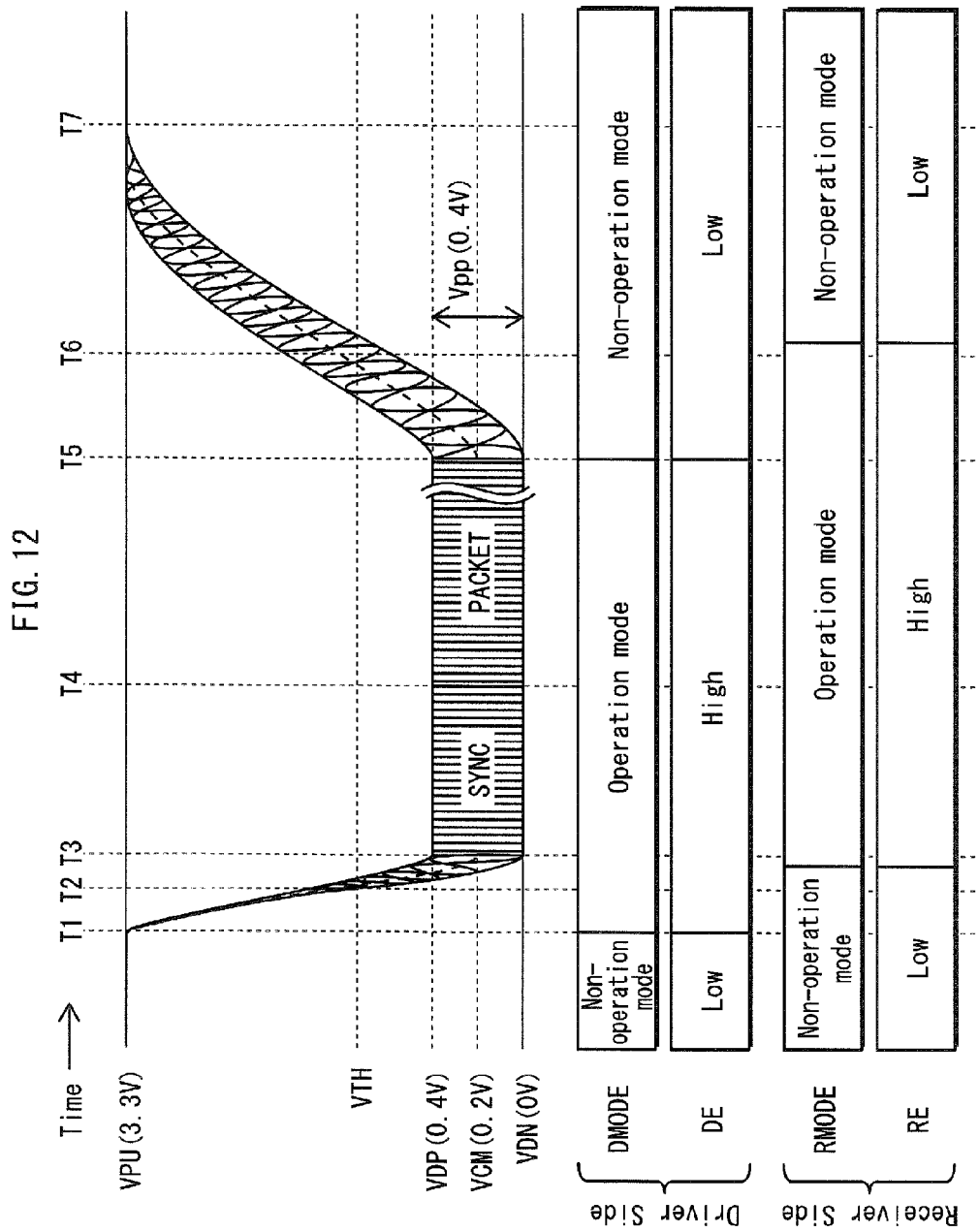
FIG. 12 is an operation timing diagram of an interface circuit that does not output a differential low fixed signal or a differential high fixed signal.

FIG. 12 is an operation timing diagram of an interface circuit that does not output the differential low fixed signal or the differential high fixed signal.

Figure 13:
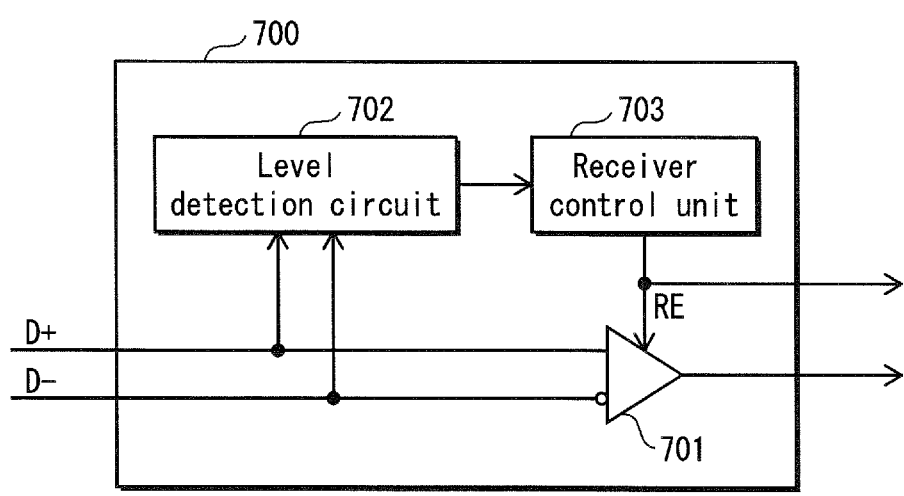
FIG. 13 shows the detailed structure of a receiver circuit 700.

The structure of such a communications system is the same as the communications system in Embodiment 2, except that the receiver circuit 600 is replaced with a receiver circuit 700 shown in FIG. 13. In the following description, the pull-up resistors 503 are connected to a power-supply voltage of 3.3 V.

The receiver circuit 700 is provided with a differential receiver 701, a level detection circuit 702, and a receiver control unit 703. The differential receiver 701 and the receiver control unit 703 have similar functions to the differential receiver 601 and the receiver control unit 603 in the receiver circuit 600. The level detection circuit 702 is connected to both the D+ signal line and the D− signal line and has the function of detecting the electric potential of each of these signal lines.

At time T1, when data for transmission is generated in the host device 100, the control unit 108a causes the driver mode control signal DMODE to transition to operation mode. When the driver mode control signal DMODE transitions to operation mode, the driver control unit 502 switches the driver enable signal DE to high, and the differential driver 501 enters the enable state. Upon entering the enable state, the differential driver 501 outputs the differential low fixed signal and the differential high fixed signal. The electric potentials of the differential signal lines thus transition to the positive electric potential $V_{DP}$ of the differential signal and the negative electric potential $V_{DN}$ of the differential signal.

At time T2, while the electric potentials of the differential signal lines are respectively transitioning to the positive electric potential $V_{DP}$ of the differential signal and the negative electric potential $V_{DN}$ of the differential signal, the receiver circuit 700 detects that the electric potential of at least one of the differential signal lines has become lower than a threshold electric potential $V'''_{TH}$. The receiver control unit 703 sets the receiver enable signal RE to high, whereby the differential receiver 701 enters the enable state, and the receiver mode control signal RMODE is set to the operation mode.

Operations from time T3 to time T4 are similar to operations from time T4 to time T5 in Embodiment 2. The driver circuit 500 transmits the synchronization symbol and transmits packets. The receiver circuit 700 receives the synchronization symbol, performs symbol synchronization, and receives the packets.

At time T5, the driver circuit 500 finishes transmitting the packets, and the control unit 108a sets the driver mode control signal DMODE to the non-operation mode. Upon the driver mode control signal DMODE entering the non-operation mode, the driver control unit 502 sets the driver enable signal DE to low, and the differential driver 501 enters the disable state. Subsequently, the pair of differential signal lines 102 start to transition to the pull-up electric potential $V_{PU}$.

At time T6, the receiver circuit 700 detects that the electric potential of at least one of the differential signal lines has become equal to or greater than the threshold electric potential V'''TH. The receiver control unit 703 sets the receiver enable signal RE to low, the differential receiver 701 enters the enable state, and the control unit 108b sets the receiver mode control signal RMODE to the non-operation mode.

At this point, the level detection circuit 702 may detect both of the differential signal lines and consider a logical sum, or a logical product, of the detection results to be the final detection results.

Figure 14:
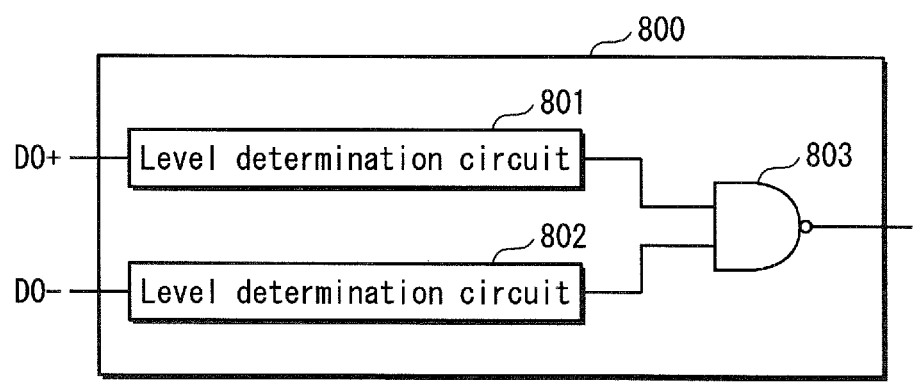
FIG. 14 shows the detailed structure of a receiver control unit 800.
Figure 15:
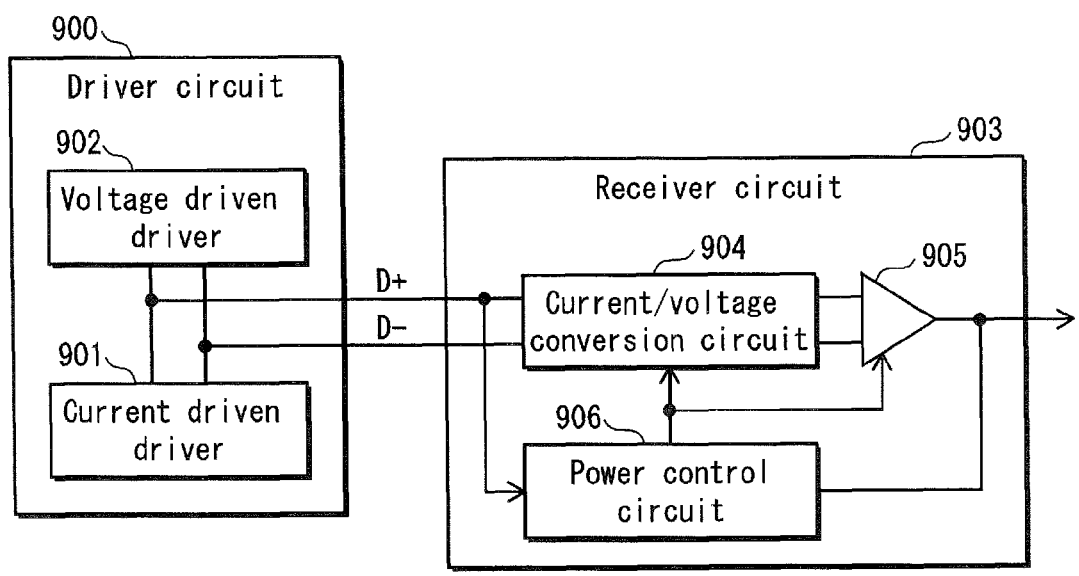
FIG. 15 shows the structure of a conventional interface circuit.

The receiver control unit 703 may include the level detection circuit 702 in the receiver control unit 703, as in a receiver control unit 800 shown in FIG. 14. The receiver control unit 800 includes a level determination circuit 801, a level determination circuit 802, and a NAND circuit 803. The level determination circuit 801 detects the electric potential of the D+ signal line. The level determination circuit 802 detects the electric potential of the D− signal line. The NAND circuit 803 accepts the results of both detections as input and outputs the receiver enable signal RE. The receiver enable signal RE may be used as is as the receiver mode control signal RMODE.

With this structure, however, when the differential signal lines transition from the pull-up electric potential $V_{PU}$ to the positive electric potential $V_{DP}$ of the differential signal and the negative electric potential $V_{DN}$ of the differential signal, or from the positive electric potential $V_{DP}$ of the differential signal and the negative electric potential $V_{DN}$ of the differential signal to the pull-up electric potential $V_{PU}$, bit transition occurs, and an unspecified period occurs near the threshold electric potential $V'''_{TH}$. Therefore, when pulling up the pair of differential signal lines 102 with pull-up resistors, Embodiment 2 is the more preferred Embodiment.

(3) In the above Embodiments, the differential driver is voltage driven by the regulator, but the differential driver may be current driven instead.

(4) In the above Embodiments, the driver control unit 202 controls the driver enable signal DE in accordance with the driver mode control signal DMODE controlled by the control unit 108a. However, a structure may be adopted in which the control unit 108a includes the driver control unit 202 and directly outputs the driver enable signal DE.

(5) In the above Embodiments, the receiver control unit 303 sets the receiver enable signal RE to high upon receiving an output of "high" from the amplitude detection circuit 302 and to low upon receiving an output of "low" from the amplitude detection circuit 302. However, in order to output a stable receiver enable signal RE, the receiver control unit 303 may for example set the receiver enable signal RE to high upon receiving an output of "high" from the amplitude detection circuit 302 a predetermined number of times or greater, and to low upon receiving an output of "low" a predetermined number of times or greater. This structure prevents switching of the differential receiver when a transition in the electric potentials of the differential signal lines is detected when a switch is not supposed to occur.

(6) In the above Embodiments, the target device 101 is described as a semiconductor memory card, but the target device 101 may be a transmission device, a display device, a camera, or the like. If the target device 101 is a transmission device, a communications module including a Radio Frequency (RF) transceiver, a baseband circuit, a Media Access Control (MAC), and the like is used as the backend unit 109. If the target device 101 is used for one-directional high speed transmission to the host device 100, as in a display device or a camera, it suffices to provide the interface circuit 104 in the target device 101 and in the host device 100 with the driver circuit 106 and the receiver circuit 107 respectively. Furthermore, a structure may be adopted wherein the host device 100 transmits a clock to the target device 101.

(7) In the above Embodiments, the coding scheme used in the encoder 403 and the decoder 407 is 8 b/10 b, but 64 b/66 b or another scheme may be used.

(8) In Embodiment 1, the driver circuit 106 does not use pull-down resistors, and the differential driver 201 maintains the pair of differential signal lines at 0 V during the power-down state. However, the driver circuit 106 may be provided with grounded pull-down resisters, and the differential signal lines may be maintained at 0 V by the pull-down resistors. In this case, the detailed structure of the differential driver 201 shown in FIG. 2 is similar to the differential driver 501 shown in FIG. 9. When the driver enable signal DE is low, the pair of differential signal lines

102 are in the high impedance state, at which point both of the differential signal lines 102 are maintained at 0 V by the pull-down resistors.

(9) In Embodiment 1, the amplitude detection circuit 302 is connected at the positive terminal to the D− signal line and at the negative terminal to the D+ signal line and detects, as the differential amplitude, the difference in electric potentials yielded by subtracting the electric potential input at the negative terminal from the electric potential input at the positive terminal. However, the amplitude detection circuit may detect an absolute value of the differential amplitude. In this case, the amplitude detection circuit is OR connected to a comparator similar to the comparator of the amplitude detection circuit 302 and a comparator that is connected at the positive terminal to the D+ signal line and at the negative terminal to the D− signal line and that detects, as the differential amplitude, the difference in electric potentials yielded by subtracting the electric potential input at the negative terminal from the electric potential input at the positive terminal

(10) In the above Embodiments, the amplitude detection circuit 302 and the level detection circuit 602 are implemented as digital circuitry such as a CMOS buffer. However, the amplitude detection circuit 302 and the level detection circuit 602 may be implemented by a Schmidt trigger circuit that includes an analog comparator. Furthermore, the disable state of the amplitude detection circuit 302 and the level detection circuit 602 may be a state in which power supply ceases.

(11) In Embodiment 2 above, the pull-up resistors 503 are connected to the differential signal lines on the side of the driver circuit 500, but connection is not limited to this location. The pull-up resistors 503 may be connected to the differential signal lines anywhere between the driver circuit 500 and the receiver circuit 600. Furthermore, the pull-up resistors 503 may be not only externally provided resistors, but also on-chip resistors formed from transistors within the semiconductor chip. In this case, the pull-up resistors may be structured to connect to the pull-up electric potential only when the driver circuit 500 is in the power-down state.

(12) The above Embodiments and Modifications may be partially combined.

The following further describes modifications to and advantageous effects of the driver circuit and the receiver circuit, as well as a method of controlling a communications system including the driver circuit and the receiver circuit, according to an Embodiment of the present invention.

(a) A receiver circuit according to an Embodiment of the present invention (see FIG. 4) is connected to a driver circuit by a pair of differential signal lines and comprises: a differential receiver (differential receiver 301) configured to receive a differential signal transmitted by the driver circuit on the differential signal lines, the differential signal being data coded with a predetermined transmission coding scheme; a detection circuit (amplitude detection circuit 302) configured to detect that electric potentials of the differential signal lines have changed to a first condition, after being maintained at a predetermined electric potential, when the driver circuit transmits a first fixed differential signal by maintaining the differential signal lines respectively at different electric potentials for a period of time longer than a maximum period of time during which the differential signal lines have respectively fixed electric potentials according to the transmission coding scheme; and a receiver control unit (receiver control unit 303) configured to switch the differential receiver from a disable state to an enable state when the detection circuit detects the change to the first condition.

The first fixed differential signal is, for example, the differential low fixed signal, and a "period of time longer than . . . " is the predetermined time referred to in this description. In other words, since in the 8 b/10 b transmission coding scheme, no signal with the same electric potential is output for longer than the transmission time corresponding to five bits, the differential low fixed signal continuously outputs the same electric potentials for at least the transmission time corresponding to six bits. The enable state of the differential receiver refers to a state in which a differential signal can be received. In this state, power is consumed, since current steadily flows in the differential receiver. The disable state of the differential receiver refers to a state in which a differential signal cannot be received. Power consumption is reduced, since no current flows. In the receiver circuit, the state in which the differential receiver is disabled is referred to as the power-down state, and the state in which the differential receiver is enabled is referred to as the normal state.

The receiver circuit detects that electric potentials of the differential signal lines have changed to the first condition, after being maintained at a predetermined electric potential, when the first fixed differential signal is transmitted by the driver circuit and switches from the power-down state to the normal state. Therefore, with the above structure, a simplified driver circuit notifies the receiver circuit of when to switch from the power-down state to the normal state.

The differential receiver is, for example, the differential receiver 301 in Embodiment 1. The detection circuit is, for example, the amplitude detection circuit 302 in Embodiment 1. The receiver control unit is, for example, the receiver control unit 303.

(b) The detection circuit may be further configured to detect that the electric potentials of the differential signal lines have changed to a second condition when the driver circuit transmits a second fixed differential signal, different from the first fixed differential signal, by maintaining the differential signal lines respectively at different electric potentials for a period of time longer than the maximum period of time during which the differential signal lines have respectively fixed electric potentials according to the transmission coding scheme, and the receiver control unit may be further configured to switch the differential receiver from the enable state to the disable state when the detection circuit detects the change to the second condition.

The second fixed differential signal is, for example, the differential high fixed signal. The differential high fixed signal is a differential signal in which the same electric potentials, which differ from those of the differential low fixed signal, are continuously output for at least a period of time corresponding to six bits.

The receiver circuit detects that electric potentials of the differential signal lines have changed to the second condition when the second fixed differential signal is transmitted by the driver circuit and switches from the power-down state to the normal state. Therefore, with the above structure, a simplified driver circuit notifies the receiver circuit of when to switch from the power-down state to the normal state.

(c) The detection circuit may detect a differential amplitude of the differential signal lines, and the detection circuit may detect the change to the first condition by detecting that the differential amplitude of the differential signal lines has reached a predetermined level and detect that the differential amplitude of the differential signal lines has reached at most a level that is approximately zero.

For example, the first condition is that the amplitude of the differential signal lines has become equal to or greater than the threshold $V_{TH}$, and the second condition is that the amplitude of the differential signal lines has become smaller than the threshold $V_{TH}$.

With the above structure, since the detection circuit detects the amplitude of the differential signal lines, the receiver circuit transitions from the power-down state to the normal state when the detection circuit detects the first condition in which the amplitude has become equal to or greater than a predetermined value, such as the threshold $V_{TH}$, and transitions from the normal state to the power-down state when the detection circuit detects the second condition in which the amplitude has become less than the threshold $V_{TH}$.

(d) A detection circuit control unit may be further provided, the detection circuit control unit being configured to set the detection circuit to a disable state upon receiving a signal based on the differential receiver having received the first fixed differential signal and to an enable state upon receiving a signal based on the differential receiver having received the second fixed differential signal.

With the above structure, the receiver circuit sets the detection circuit to the disable state during the normal state. This prevents the detection circuit from detecting, during the normal state, the differential signal lines which vary in amplitude due to data transmission and thus prevents switching from the normal state to the power-down state.

(e) The detection circuit may detect the electric potential of at least one of the differential signal lines, and the detection circuit may detect the change to the first condition by determining, in accordance with the first fixed differential signal transmitted by the driver circuit, that the electric potential of the one of the differential signal lines has become lower than a pull-up electric potential that is higher than a higher one of the electric potentials of the differential signal during data transmission, and detect the change to the second condition by determining, in accordance with the second fixed differential signal transmitted by the driver circuit, that the electric potential of the one of the differential signal lines has become near the pull-up electric potential.

For example, the first condition is that the electric potential of at least one of the differential signal lines is lower than a threshold electric potential $V'_{TH}$ set between the pull-up electric potential and the positive electric potential of the differential signal, and the second condition is that the electric potential of at least one of the differential signal lines is equal to or greater than the threshold electric potential $V'_{TH}$.

With the above structure, since the detection circuit detects the electric potential of at least one of the differential signal lines, the receiver circuit switches from the power-down state to the normal state when the detection circuit detects the change to the first condition by determining, in accordance with the first fixed differential signal transmitted by the driver circuit, that the electric potential of the one of the differential signal lines has become lower than a pull-up electric potential that is higher than a higher electric potential of the differential signal during data transmission, and the receiver circuit switches from the normal state to the power-down state when the detection circuit detects the change to the second condition by determining, in accordance with the second fixed differential signal transmitted by the driver circuit, that the electric potential of the one of the differential signal lines has become near the pull-up electric potential.

(f) A driver circuit according to an Embodiment of the present invention is connected to a receiver circuit by a pair of differential signal lines and comprises: a state maintaining circuit configured to maintain the differential signal lines at a predetermined electric potential while data is not being transferred; and a differential driver configured to transmit, before transmitting data coded with a predetermined transmission coding scheme as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme.

By outputting the first fixed differential signal, the driver circuit causes the electric potentials of the differential signal lines, which were maintained at a predetermined electric potential, to transition and notifies the receiver of when to switch from the power-down state to the normal state. Therefore, with the above structure, a simplified circuit structure not including a voltage driven driver is used to notify the receiver circuit of when to switch from the power-down state to the normal state.

(g) The driver circuit may further comprise a driver control unit configured to set the differential driver to a disable state while the differential driver is not transferring data and to an enable state when the differential driver transfers data, wherein the differential driver is further configured to transmit, before the driver control unit sets the differential driver to the disable state, a second fixed differential signal, different from the first fixed differential signal, by maintaining the differential signal lines respectively at different electric potentials for a period of time longer than the maximum period of time during which the differential signal lines have respectively fixed electric potentials according to the transmission coding scheme.

By outputting the second fixed differential signal and causing the electric potentials of the differential signal lines to transition before the driver control unit sets the differential driver to the disable state, the driver circuit notifies the receiver of when to switch from the normal state to the power-down state. Therefore, with the above structure, a simplified circuit structure not including a voltage driven driver is used to notify the receiver circuit of when to switch from the normal state to the power-down state.

(h) The state maintaining circuit may be a portion of circuitry in the differential driver and cause the differential driver, while not transferring data, to maintain the differential signal lines at the predetermined electric potential within an amplitude range of the differential signal during data transfer.

With the above structure, when the driver circuit is not transmitting data, the state maintaining circuit, which is a portion of circuitry in the differential driver, causes the differential driver to maintain the differential signal lines at the predetermined electric potential. The differential amplitude thus becomes zero. When the driver circuit is transmitting data, the differential driver outputs the differential signal. The differential amplitude is thus produced. The driver circuit thus notifies the receiver circuit of when to switch between the normal state and the power-down state.

(i) The state maintaining circuit may cause the differential driver to maintain the electric potentials of the differential signal lines at zero volts while not transferring data.

The state maintaining circuit is, for example, the circuit related to input of the pull-down enable signal PE in the differential driver shown in FIG. 3. When the pull-down enable signal PE indicates "high", the differential signal lines are both grounded, and therefore the differential driver maintains the differential signal lines both at zero volts via the state maintaining circuit.

With the above structure, when the driver circuit is not transmitting data, the state maintaining circuit, which is a portion of circuitry in the differential driver, causes the differential driver to maintain the differential signal lines at zero volts. The differential amplitude thus becomes zero. When the driver circuit is transmitting data, the differential driver outputs the differential signal. The differential amplitude is thus produced. The driver circuit thus notifies the receiver circuit of when to switch between the normal state and the power-down state.

(j) The state maintaining circuit may be a pull-up resistor configured to maintain, when data is not being transferred, the differential signal lines at a pull-up electric potential that is higher than a higher electric potential of the differential signal during data transmission.

With the above structure, when the driver circuit is not transmitting data, the state maintaining circuit maintains the differential signal lines at the pull-up electric potential, which is higher than the positive electric potential of the differential signal, via the pull-up resistor. The driver circuit outputs the first fixed differential signal before transferring data and the second fixed differential signal upon completion of data transfer, before the driver control unit sets the differential driver to the disable state. The driver circuit thus notifies the receiver circuit of when to switch between the normal state and the power-down state.

(k) A communications system according to an Embodiment of the present invention comprises a driver circuit and a receiver circuit connected by a pair of differential signal lines, wherein the driver circuit comprises: a state maintaining circuit configured to maintain the differential signal lines at a predetermined electric potential while data is not being transferred; and a differential driver configured to transmit, when data coded with a predetermined transmission coding scheme is to be transferred, and before transmitting the data as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme, and the receiver circuit comprises: a differential receiver configured to receive the differential signal on the differential signal lines; a detection circuit configured to detect that electric potentials of the differential signal lines have changed to a first condition when the driver circuit transmits the first fixed differential signal; and a receiver control unit configured to switch the differential receiver from a disable state to an enable state when the detection circuit detects the change to the first condition.

In the communications system with this structure, the driver circuit transmits, before target data for transmission, the first fixed differential signal that is not generated in the transmission coding scheme, thus causing the electric potentials of the differential signal lines, which were maintained at a predetermined electric potential, to change. In this way, the driver circuit notifies the receiver circuit of when to switch from the power-down state to the normal state, and the receiver circuit transitions from the power-down state to the normal state. This structure achieves a communications system for a simplified driver circuit that does not include a voltage driven driver to notify the receiver circuit of when to switch from the power-down state to the normal state.

INDUSTRIAL APPLICABILITY

The present invention can be usefully applied to a driver circuit and a receiver circuit, and to a method of controlling a communications system including the driver circuit and the receiver circuit, that reliably perform synchronized power-down control between the driver circuit and the receiver circuit without a complicated circuit configuration.

REFERENCE SIGNS LIST 100 host device
101 target device
102, 103 differential signal lines
104 interface circuit
105 data processor
106, 500 driver circuit
107, 600, 700 receiver circuit
108 control unit
109 backend unit
201, 501 differential driver
202, 502 driver control unit
301, 601, 701 differential receiver
302 amplitude detection circuit
303, 603, 703 receiver control unit
304 amplitude detection circuit control unit
401 data converter
402 link controller
403 encoder
404 parallel to serial converter
405 CDR circuit
406 serial to parallel converter
407 decoder
408 oscillator
409 PLL circuit
503 pull-up resistor
604 level detection circuit control unit

The invention claimed is:

1. A receiver circuit connected to a driver circuit by a pair of differential signal lines, the receiver circuit comprising:
a differential receiver configured to receive a differential signal transmitted by the driver circuit on the differential signal lines, the differential signal being coded with a predetermined transmission coding scheme;
a detection circuit configured to detect that electric potentials of the differential signal lines have changed to a first condition, after being maintained at a predetermined electric potential, when the driver circuit transmits a first fixed differential signal by maintaining the differential signal lines respectively at different electric potentials for a period of time longer than a maximum period of time during which the differential signal lines have respectively fixed electric potentials according to the transmission coding scheme; and
a receiver control unit configured to switch the differential receiver from a disable state to an enable state when the detection circuit detects the change to the first condition.

2. The receiver circuit of claim 1, wherein
the detection circuit is further configured to detect that the electric potentials of the differential signal lines have changed to a second condition when the driver circuit transmits a second fixed differential signal, different from the first fixed differential signal, by maintaining the differential signal lines respectively at different electric potentials for a period of time longer than the maximum period of time, and
the receiver control unit is further configured to switch the differential receiver from the enable state to the disable state when the detection circuit detects the change to the second condition.

3. The receiver circuit of claim 2, wherein
the detection circuit detects a differential amplitude of the differential signal lines, and
the detection circuit detects the change to the first condition by detecting that the differential amplitude of the differential signal lines has reached a predetermined level and detects the change to the second condition by detecting that the differential amplitude of the differential signal lines has reached at most a level that is approximately zero.

4. The receiver circuit of claim 3, further comprising:
a detection circuit control unit configured to set the detection circuit to a disable state upon receiving a signal based on the detection circuit having received the first fixed differential signal and to an enable state upon receiving a signal based on the differential receiver having received the second fixed differential signal.

5. The receiver circuit of claim 2, wherein
the detection circuit detects the electric potential of at least one of the differential signal lines, and
the detection circuit detects the change to the first condition by determining, in accordance with the first fixed differential signal transmitted by the driver circuit, that the electric potential of the one of the differential signal lines has become lower than a pull-up electric potential that is higher than a higher one of the electric potentials of the differential signal during data transmission, and detects the change to the second condition by determining, in accordance with the second fixed differential signal transmitted by the driver circuit, that the electric potential of the one of the differential signal lines has become near the pull-up electric potential.

6. A driver circuit connected to a receiver circuit by a pair of differential signal lines, the driver circuit comprising:
a state maintaining circuit configured to maintain the differential signal lines at a predetermined electric potential while data is not being transferred; and
a differential driver configured to transmit, before transmitting data coded with a predetermined transmission coding scheme as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme.

7. The driver circuit of claim 6, further comprising:
a driver control unit configured to set the differential driver to a disable state while the differential driver is not transferring data and to an enable state when the differential driver transfers data, wherein
the differential driver is further configured to transmit, before the driver control unit sets the differential driver to the disable state, a second fixed differential signal, different from the first fixed differential signal, by maintaining the differential signal lines respectively at different electric potentials for a period of time longer than the maximum period of time.

8. The driver circuit of claim 7, wherein
the state maintaining circuit is a portion of circuitry in the differential driver and causes the differential driver, while not transferring data, to maintain the differential signal lines at the predetermined electric potential within an amplitude range of the differential signal during data transfer.

9. The driver circuit of claim 8, wherein
the state maintaining circuit causes the differential driver to maintain the electric potentials of the differential signal lines at zero volts while not transferring data.

10. The driver circuit of claim 7, wherein
the state maintaining circuit is a pull-up resistor configured to maintain, when the differential driver is not transferring data, the differential signal lines at a pull-up electric potential that is higher than a higher electric potential of the differential signal during data transmission.

11. A communications system comprising a driver circuit and a receiver circuit connected by a pair of differential signal lines, wherein
the driver circuit comprises:
a state maintaining circuit configured to maintain the differential signal lines at a predetermined electric potential while data is not being transferred; and
a differential driver configured to transmit, when data coded with a predetermined transmission coding scheme is to be transferred, and before transmitting the data as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme, and
the receiver circuit comprises:
a differential receiver configured to receive the differential signal on the differential signal lines;
a detection circuit configured to detect that electric potentials of the differential signal lines have changed to a first condition when the driver circuit transmits the first fixed differential signal; and
a receiver control unit configured to switch the differential receiver from a disable state to an enable state when the detection circuit detects the change to the first condition.

12. A control method used in a communications system including a driver circuit and a receiver circuit connected by a pair of differential signal lines, the control method comprising the steps of:
a state maintaining step in which the driver circuit maintains the differential signal lines at a predetermined electric potential while data is not being transferred;
a transmission step in which the driver circuit transmits, before transmitting data coded with a predetermined transmission coding scheme as a differential signal on the differential signal lines, a first fixed differential signal by maintaining the differential signal lines respectively at different electric potentials for a period of time longer than a maximum period of time during which the differential signal lines have respectively fixed electric potentials according to the transmission coding scheme;
a reception step in which the receiver circuit receives the differential signal on the differential signal lines;
a detection step in which the receiver circuit detects that electric potentials of the differential signal lines have changed to a first condition, after being maintained at a predetermined electric potential, when the first fixed differential signal is transmitted; and
a receiver control step of switching the receiver circuit that performs the reception step from a disable state to an enable state when the change to the first condition is detected in the detection step.

* * * * *